Figure 1:
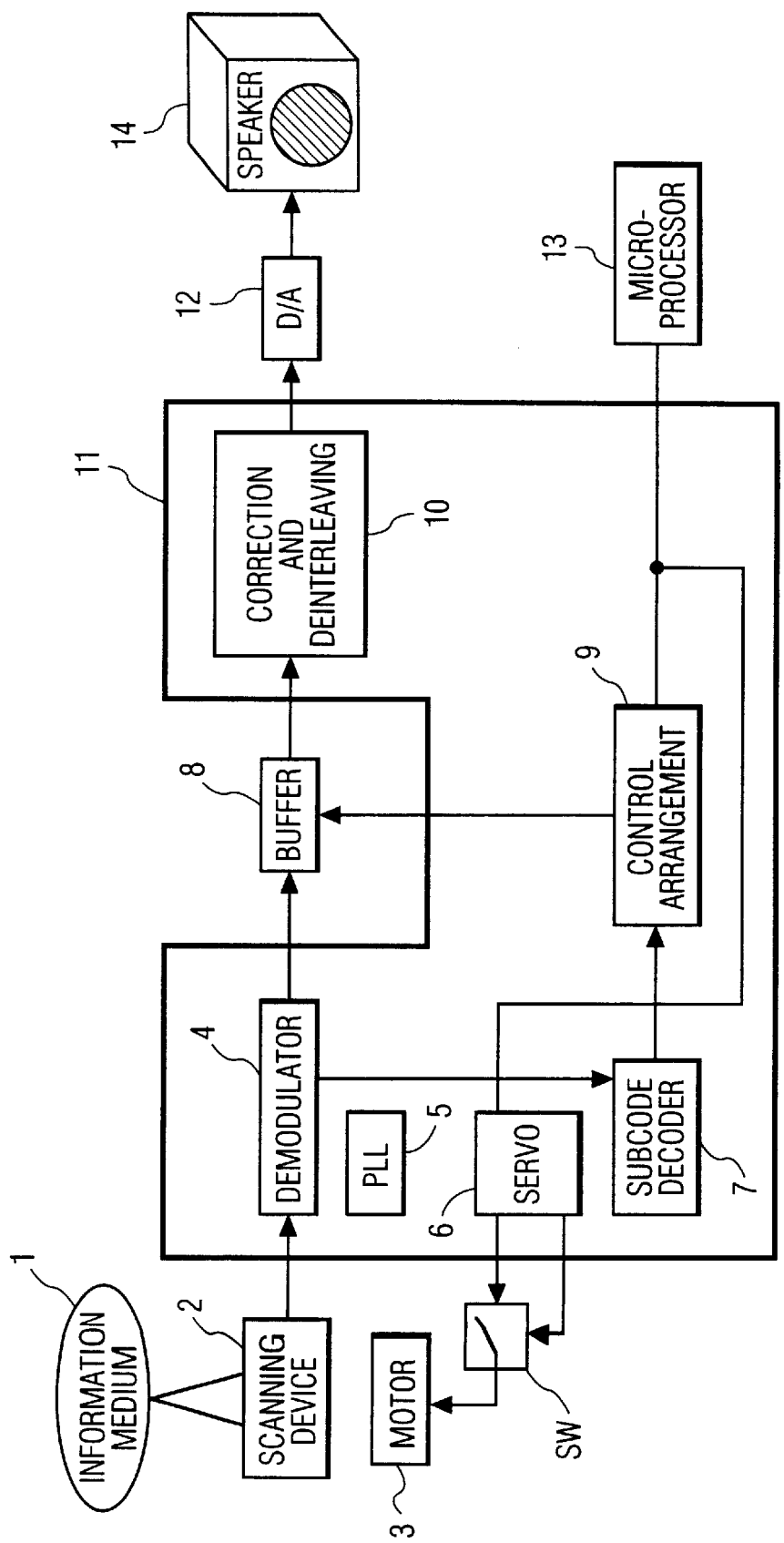

United States Patent

Takagi et al.

[11] Patent Number: 5,995,460
[45] Date of Patent: *Nov. 30, 1999

[54] VIBRATION-RESISTANT PLAYBACK DEVICE

[75] Inventors: Hirohito Takagi, Villingen-Schwenningen; Richard Rutschmann, Wutöschingen, both of Germany

[73] Assignee: Deutsche Thomson-Brandt GmbH, Villingen-Schwenningen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/568,128

[22] Filed: Dec. 6, 1995

[30] Foreign Application Priority Data

Dec. 16, 1994 [DE] Germany ............... 44 45 023

[51] Int. Cl.[6] .................................................. G11B 5/09
[52] U.S. Cl. .......................................... 369/48; 369/60
[58] Field of Search .................. 369/47, 50, 59, 369/60, 32, 48, 53, 58; 365/200; 360/27

[56] References Cited

U.S. PATENT DOCUMENTS 5,414,758  5/1995  Kuok ..................... 365/200 X
5,517,477  5/1996  Sako ........................... 369/60

FOREIGN PATENT DOCUMENTS 0630004  12/1994  European Pat. Off. .
3030759   3/1982  Germany .
3531794   3/1987  Germany .
4313177  10/1993  Germany .

*Primary Examiner*—Paul W. Huber
*Attorney, Agent, or Firm*—Joseph S. Tripoli; Peter M. Emanuel; Paul P. Kiel

[57] ABSTRACT

A method and an arrangement for a vibration-resistant playback device, in which uninterrupted and undisturbed reproduction of information is assured despite vibrations, by use of a "shock-proof memory" by arrangement of a buffer between an EFM demodulator, and a de-interleaving and error correction unit, which provides the digital audio information. The buffer can be made of an ARAM (audio RAM), which is less expensive than a DRAM. The ARAM can be partially defective, and its use is made possible by the arrangement before the error correction unit. Subcode information is preferably used to synchronize the data in the buffer following an interruption.

4 Claims, 4 Drawing Sheets

VIBRATION-RESISTANT PLAYBACK DEVICE

The invention relates to a vibration-resistant playback device, which has a low power consumption and a cost-effective structure despite the so-called "shock-proof memory" or "shock-protection memory" and the scanning of the information medium at increased speed. The field of application of vibration-resistant playback devices applies, in particular, to the portable and mobile use of playback devices of optical information media, in which uninterrupted and undisturbed reproduction of information must be ensured despite vibrations, the field of application not being restricted, however, to optical information media.

The strength to withstand shocks and vibrations acting on the device from the outside is of crucial significance for the functionality of portable CD players. In order to enjoy CDs when jogging, it is known to provide a "digital shock absorber", cf. Walter Schild: A digital shock absorber in order to enjoy CDs when jogging, in the daily newspaper Die Welt, dated Jul. 16, 1992. In order to permit undisturbed and uninterrupted reproduction of information despite a brief interruption in the scanning of information from the CD as a result of a shock which causes the laser or scanning beam to lose the information track, the CD is driven at twice the speed and data read from the information medium are buffered. Data are then available from the buffer for the undisturbed reproduction of information during the period of an interruption. This property of portable CD players is therefore also referred to as so-called "shock-proof memory" or "shock-protection memory". The disk which is driven at twice the speed supplies data twice as fast as is necessary for the reproduction, with the result that the buffer is rapidly filled with data once more even after an interruption. In this case, however, the driving rotational speed is not constant, since CDs are read at a constant linear velocity, the so-called CLV. Since the CD has a smaller number of pits in the inner region of the disk than in the outer region, for one revolution, the driving rotational speed of the disk turntable is correspondingly reduced when reading from the inner to the outer region in order to ensure a constant reading speed. In this case, a constant reference frequency corresponding to the reading speed is used to control the rotational speed. The current speed information is taken from the frequency of the signal scanned from the information medium, which frequency forms the so-called actual value in the control loop.

If the buffer is completely full, the reading in of data is interrupted until a predetermined occupancy which warrants the further reading in of data is reached. During this time, too, the information medium is driven at twice the speed and the scanning speed is controlled by the control loop to a constant linear velocity CLV. The interruption of the read-in operation causes frequent track jumping and frequent rotational speed changes even without the occurrence of disturbances, since the scanning of the information medium following an interruption of the read operation must be resumed at a point at which the read operation was previously interrupted. The frequent track jumping and the driving of the information medium at twice the speed result in an increased power requirement, which has a particularly disadvantageous effect on the total playing time which can be attained by batteries. The total playing time which can be attained using a set of batteries in shock-proof operation is reduced approximately by half in comparison with normal operation at normal scanning speed on account of the drive at twice the speed, decoding of the scanning signal at twice the speed and an increased number of movements of the actuator or scanning system owing to increased track jumping.

Therefore, the object of the invention is to provide a vibration-resistant playback device which has a cost-effective structure despite ensuring the "shock-proof memory" function.

This object is achieved by means of the features specified in independent claims. Advantageous refinements and developments are specified in dependent claims.

One aspect of the invention is to provide the arrangement of the buffer between the EFM demodulator and the de-interleaving and error correction unit which provides the digital audio information, as a result of which use can be made of an ARAM, which is less expensive than a DRAM. The use of an ARAM or audio RAM, which can be partially defective, is made possible by the arrangement before the error correction. In order to reduce the power consumption of vibration-resistant playback devices, a power supply-reducing means is provided, by means of which the power supply to the drive motor of the information medium is temporarily interrupted or at least reduced. If a stationary information medium and special drive means influencing the reading speed were to be provided, then the power supply of said means could be correspondingly interrupted or reduced. Moreover, in contrast with the fundamental reading at twice the speed, the information medium is read at an increased speed only for the purpose of filling the buffer, and the known vibration resistance is, nevertheless, reliably achieved. Since filling of the buffer is necessary only after a restart or only after a vibration-induced interruption, the information medium can be read or driven predominantly at the normal reading speed, which corresponds to the normal speed. The operation at normal speed already results in a considerably reduced power consumption, since, on the one hand, the rotational speed of the motor is correspondingly lower and, in addition, control operations and movements of the scanning system for the purpose of finding the scanning location after the interruption due to the risk of the buffer overflowing as a result of writing at twice the speed and reading at normal speed are dispensed with. In order to reduce the rotational speed, not only is the reference frequency or the desired rotational speed value in the known CLV control loop reduced, which would still likewise require a high power consumption owing to a so-called hard rotational speed changeover, but rather it is provided to interrupt the power supply to the drive motor or at least significantly reduce it. The means provided for this purpose is preferably an electronic switch provided in the power supply line to the drive motor.

By means of the reference signal source, which can be varied in a predetermined range, for controlling the rotational speed of the drive motor, the scanning speed is set as a function of the occupancy of the buffer in such a way that writing or reading-in of data to the buffer is provided at an increased speed compared to the reading-out speed from the buffer only when the occupancy of the buffer falls below a predetermined value at the starting instant of the playback operation or on account of the track being lost. During the periods in which no track is lost and the buffer has a predetermined occupancy, the information medium is driven only at normal speed. As a result of this type of rotational speed control, scanned data are no longer read into the buffer at a constant speed or at a constant frequency. Nevertheless, the reproduction of information is not disturbed if a phase-locked loop or a so-called PLL having a large capture range is provided.

Varying the reading speed without any loss in the bit timing required for the processing of the information from the information medium is made possible by means of a bit timing PLL which has a relatively large capture range. This capture range should preferably be more than ±60%. Therefore, the reproduction signal or the reproduction of information is not influenced by fluctuations in the reading speed or in the rotational speed of the drive motor of the information medium given a correspondingly large capture range in the range, for example, of from 80% to 180% of the normal value. This large capture range, which, inter alia, can also be attributed to the eight to fourteen modulation used for the data storage or data recovery, permits data to be read into the buffer at varying speeds, with the result that the rotational speed of the drive motor of the information medium can be varied within the capture range of the PLL in order to reduce the power consumption. Since the rotational speed of the drive motor can be returned to normal speed after a predetermined occupancy of the buffer has been reached, it is preferably provided, for the purpose of reducing power consumption, to disconnect the drive motor completely from the power supply during the period until the normal speed or a predetermined speed value, which may also be less than the normal speed, is reached. This disconnection is achieved by causing the connection to have a high resistance. The resulting so-called soft changeover of the rotational speed of the drive motor leads, in conjunction with the reduction in the doubled speed to the normal speed, to a considerably reduced power consumption, which permits considerably longer operation of the playback device with a set of batteries.

These advantages are achieved by means of an arrangement and a method for controlling the reading speed from the information medium as a function of a predetermined occupancy of the buffer below its maximum storage capacity, a control arrangement varying the reading speed from the information medium in order to store a predetermined amount of data in a buffer without interrupting the reproduction before said data is read from the buffer. Overflowing of the buffer or the situation where the occupancy of the buffer falls below a minimum occupancy is prevented without interrupting the reading from the information medium by the fact that a reading speed which is increased in order to fill the buffer is already reduced to normal speed at a predetermined occupancy of the buffer below its maximum storage capacity, and the number of returns is reduced thereby.

The control arrangement is preferably implemented as part of the decoder, and the buffer is preferably arranged between the EFM demodulator (EFM=eight to fourteen modulation) and the de-interleaving and error correction unit which provides the digital information. This arrangement enables simple processing of subcode information such as, for example, information regarding time and location, which then only have to be processed at normal speed in the decoder and can advantageously be used for the data synchronization. Decoding at twice the speed is unnecessary, since the buffer acts as a time base compensation element. The subcode can also be read and evaluated at a variable reading speed in the PLL capture range. The time information, that is to say the title or disk time corresponding to precisely that music which is to be heard, is calculated from the instantaneously read subcode and the occupancy.

It is advantageous, for the synchronization or for the writing of data to the buffer without any gaps, to use subcode data, preferably the synchronization word or synchronization bits, which are present in the data stream. Although the subcode data are available at different points in time, particularly as a result, too, of the reading speed which is adapted to the occupancy of the buffer, and only occur at relatively large spacings, reliable synchronization and a seamless data flow following an interruption are achieved by the fact that use is made of an item of address information which identifies the interruption location prior to the error correction in the data stream. The starting point of the synchronization is formed by a valid subcode, the address information of which can be used as a reference both for the location of the interruption on the information medium and for the last valid data in the buffer and the writing to the buffer. Using the address which identifies the location of an interruption on the information medium and in the buffer, the synchronization and the writing to the buffer after an interruption can also be implemented even before the address of the interruption, since the spacing between the last valid address, which corresponds to the synchronization byte of the last valid subcode, and the new address, which corresponds to the synchronization byte of the new valid subcode, can be calculated. The data following the address are then overwritten, resulting in a shorter time to synchronization. For this purpose, the buffer is preferably arranged upstream of the error correction and de-interleaving unit.

A data comparison is not carried out and a seamless data flow is, nevertheless, reliably achieved, despite a varying reading speed, particularly as a result of the fact that the buffer simultaneously serves as a time base compensation unit and data are read at a constant speed from the buffer.

On account of the arrangement of the buffer between the EFM demodulator and the de-interleaving and error correction unit which provides the digital audio information, it is possible to use an ARAM, which is less expensive than a DRAM. The use of an ARAM or audio RAM, which may be partially defective, is made possible by the arrangement before the error correction.

In addition to reducing the number of returns or the number of repositionings of the scanning or reading system, also referred to as a pick-up, in vibration-resistant playback devices by controlling the reading speed of the information medium as a function of the occupancy of the buffer, further aspects of the invention comprise the rapid availability of data for the reproduction after a start and the improved data synchronization.

Although the above explanations were essentially referring to a CD as the information medium, the field of application is not restricted thereby, since in principle all digital latches and information media, including, for example, the digital videodisk or digital tapes, have a comparatively similar data structure, which enables the principle upon which the invention is based to be applied.

Figure 2:
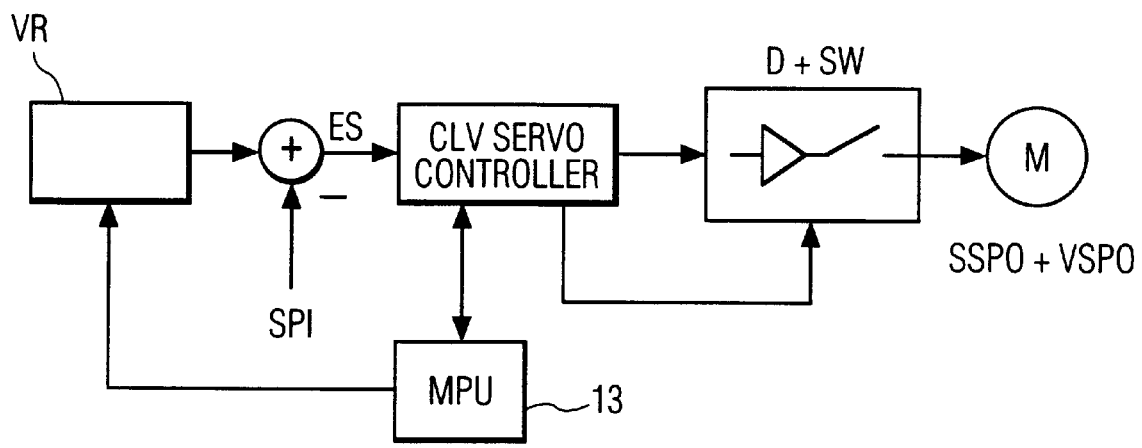
Figure 4:
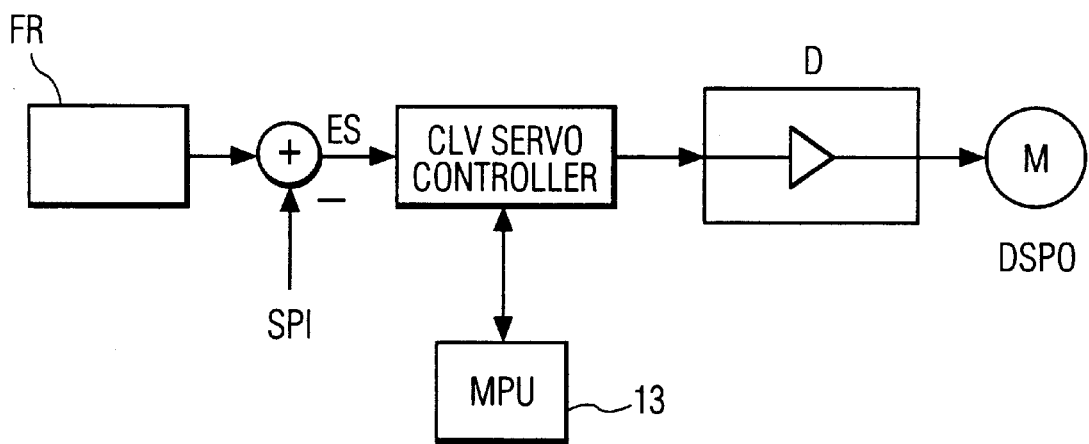
Figure 3:
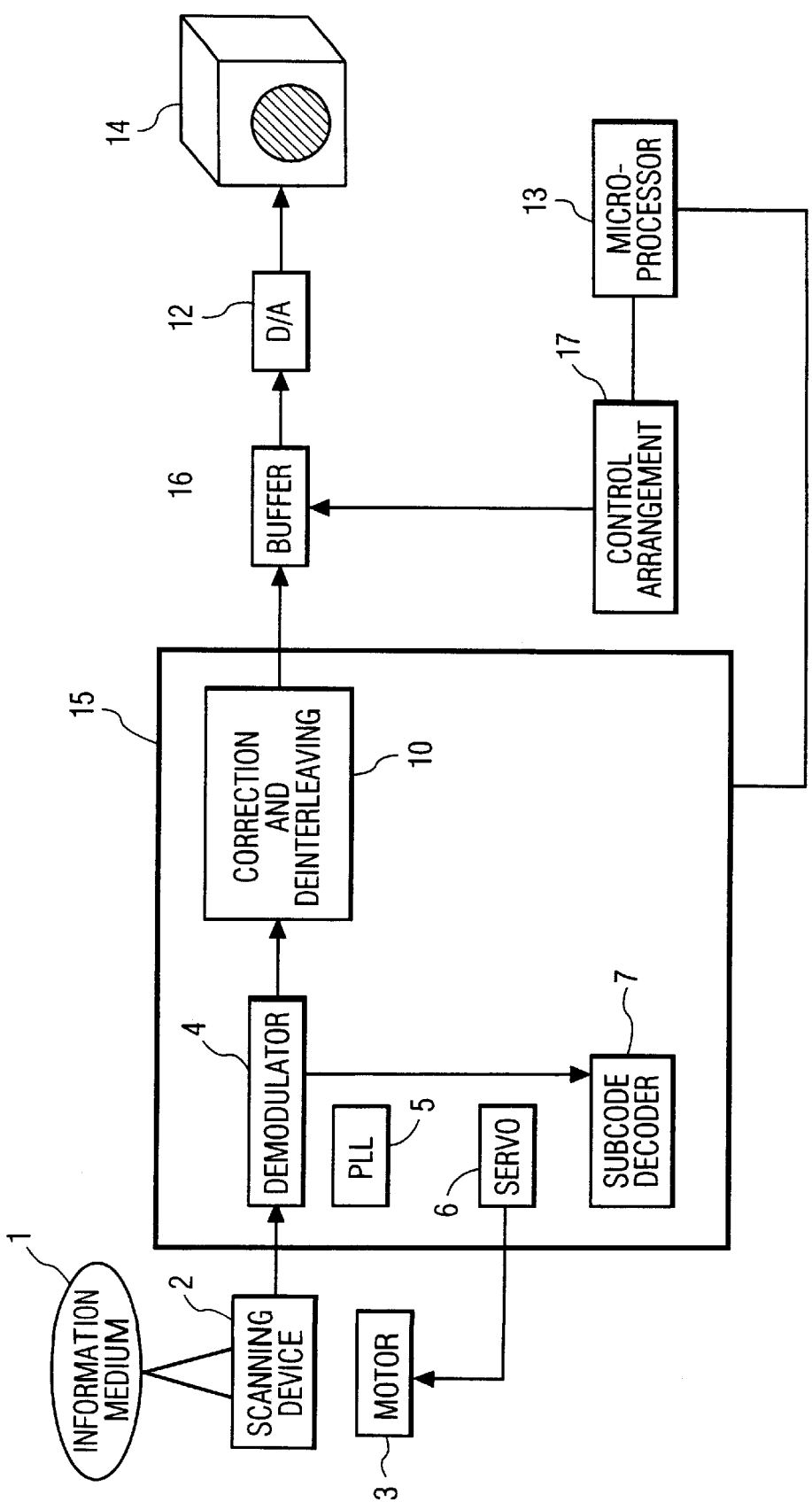
Figure 5:
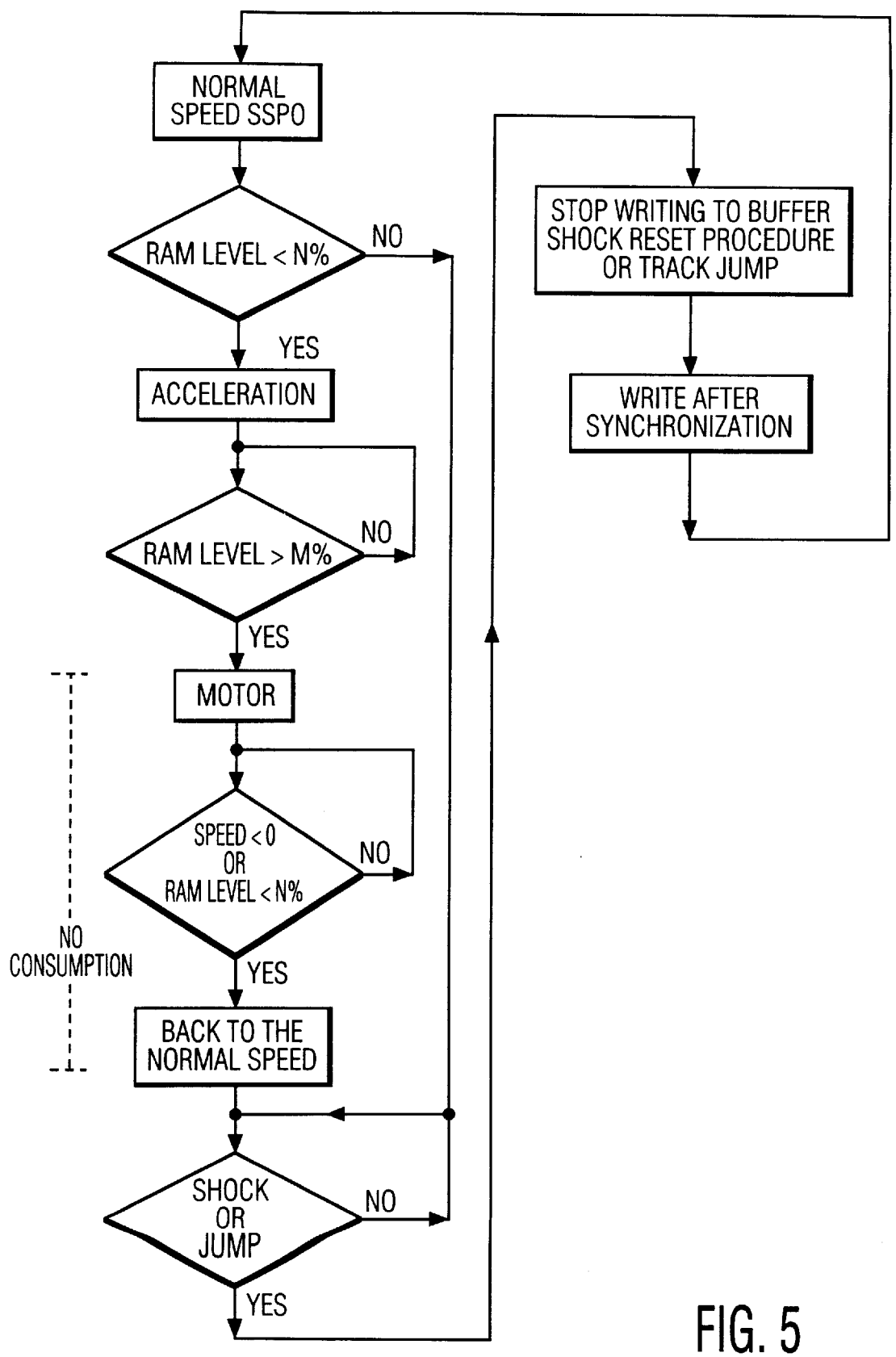

The invention is explained in more detail below with reference to drawings, in which:

FIG. 1 shows a block diagram of the vibration-resistant playback device,

FIG. 2 shows a block diagram for the control of the vibration-resistant playback device in accordance with FIG. 1, FIG. 3 shows a block diagram of a known vibration-resistant playback device, FIG. 4 shows a block diagram for the control of the known vibration-resistant playback device in accordance with FIG. 3, and FIG. 5 shows a flow diagram for controlling the improved—vibration-resistant playback device having a reduced power consumption.

Corresponding reference symbols are used consistently in the drawings. In order to bridge interruptions of the read operation from the information medium 1, the known vibration-resistant playback device in accordance with FIG.

3 has a buffer 16, which is connected to a decoder 15 containing an error correction and de-interleaving unit 10. The buffer 16 is arranged directly upstream of the digital/analog converter 12, which is connected to a reproduction device 14, and is connected to a control arrangement 17 which is connected to the microprocessor 13 of the vibration-resistant playback device. In order to ensure disturbance-free and uninterrupted reproduction of information even during an interruption of the read operation from the information medium 1 due to vibrations, data read from the information medium 1 are written at twice the speed to the buffer 16 and are read out at normal speed. The result of this is that there is always an adequate volume of data in the buffer 16 in order briefly to bridge interruptions of the read operation from the information medium 1, and the buffer 16 is filled with data once more, following an interruption of the read operation which empties the buffer 16, in order to be prepared for another interruption. The information medium 1 is driven, for the purpose of reading at twice the speed, by a motor 3 which is operated at twice the rotational speed and is connected to a CLV servo 6. The CLV servo 6 is used to vary the rotational speed of the motor 3, which is in principle doubled in the case of the known playback device, as a function of the scanning radius in order to achieve an approximately constant reading speed. This varying of the rotational speed takes place within the scope which is conventional for the constant reading speed, and not as a function of the occupancy of the buffer 16.

The information stored on the information medium 1 is detected by a pick-up forming the scanning device 2 and is fed to a pulse-shaping and EFM demodulator unit 4. Using the pulse-shaping and EFM demodulator unit 4, in particular the digital signal which arrives from the information medium 1 and is still rounded is converted into a fairly digital signal and the timing required for the further processing of the information is generated. In this case, the EFM (eight to fourteen modulation) is provided, in particular, to permit reliable timing recovery even in the case of soft passages or pauses, in which the individual bits do not toggle between their possible states. A so-called bit timing PLL 5 is used, in particular, for this purpose. Furthermore, there are provided in the decoder 15 a subcode decoder 7, which decrypts the supplementary information contained in the subcode, and also an error correction and de-interleaving unit 10, by means of which the digital audio signal is provided in the case of a CD player. In the case of the known vibration-resistant playback device in accordance with FIG. 3, a buffer 16 designed as a DRAM is connected downstream of this error correction and de-interleaving unit 10. The audio data stored in the buffer 16 for bridging an interruption of the reading of information from the information medium 1 are then fed via a digital/analog converter 12 to the reproduction device 14. A control arrangement 17, which is also referred to as a shock-proof memory controller and is connected to a microprocessor 13 which organizes the control and data evaluation of the playback device, is provided for the organization of the buffer 16 or for writing data to and reading data from the buffer 16. With the known method, audio data are written to the buffer 16 until there is an interruption of the reading of information from the information medium 1 owing to a vibration or when the maximum occupancy of the buffer 16 has been reached. After an interruption, the scanning device 2 is then reset to a scanning location corresponding to the last valid subcode address, and the reading of the information medium 1 is resumed. However, since the scanned values are not present with any accuracy in the buffer 16 after the error correction and the de-interleaving and since there is no information which identifies the address of the interruption, a comparison must be carried out, until correspondence, between audio data read anew and audio data present in the buffer 16. When correspondence is established, the writing of read data to the buffer 16 is then resumed. However, in the case of very soft information sections, muting on account of a very high error rate, or in the case of repetitions having the same information content, such a comparison results in correspondence at different locations, which correspondence does not correspond to the sequence of information stored on the information medium 1.

FIG. 4 shows a block diagram for the control of the known vibration-resistant playback device in accordance with FIG. 3, relating in particular to the control of the rotational speed of the drive motor M. In order to read the information medium 1 at a constant reading speed, use is made of a constant reference frequency FR which is compared in a summing point +with an item of speed information SPI in order to form an error signal ES. The constant reference frequency FR corresponds, in the case of the known vibration-resistant playback device, to twice the normal reading speed or twice the speed at which the buffer 16 is read out for reproducing information, so that the buffer 16 is refilled as quickly as possible following an interruption of the writing to said buffer. The current speed information SPI of the drive motor M of the information medium 1 is derived from the bit timing frequency of the data stream read from the information medium 1, with the result that the rotational speed DSPO of the drive motor M is controlled in accordance with a constant, doubled reading speed. For this purpose, a controller CLV Servo Controller is provided, and is connected to the microprocessor MPU or 13 and a driver D which controls the drive motor M. The rotational speed DSPO of the drive motor M in this case corresponds to twice the rotational speed which would be necessary to read at normal speed.

Both the method and the arrangement of FIG. 1, FIG. 2 and FIG. 5 have been correspondingly altered in comparison with the known vibration-resistant playback device.

One aspect of the invention is to provide the arrangement of the buffer 8 between the EFM demodulator 4 and the de-interleaving and error correction unit 10 which provides the digital audio information, as a result of which use can be made of an ARAM, which is less expensive than a DRAM. The use of an ARAM or audio RAM, which can be partially defective, is made possible by the arrangement before the error correction.

A further aspect of the vibration-resistant playback device having a reduced power consumption is that the reading speed from the information medium 1 is controlled by a control arrangement 9 as a function of a predetermined occupancy of the buffer, which is preferably arranged, in accordance with FIG. 1, as buffer 8 upstream of the error correction and de-interleaving unit 10. Consequently, the vibration-resistant playback device in accordance with FIG. 1 does not operate at a constant doubled reading speed. In accordance with FIG. 2 and FIG. 5, use is predominantly made of a first reading speed SSPO, which corresponds to the conventional normal speed in playback devices without special vibration protection and hence also to the speed at which data are read from a buffer 8 or 16 for the purpose of reproducing information. This first reading speed SSPO is increased to a second reading speed VSPO only during the filling of the buffer 8 or 16 up to a predetermined occupancy value N%, which is preferably less than the maximum storage capacity of the buffer 8 or 16. The occupancy value N is selected in such a way that the buffer 8 is filled only up to its maximum storage capacity, and does not overflow, during the transition from the increased second reading speed VSPO to the first reading speed SSPO. Since only the first reading speed SSPO corresponds to the speed at which the buffer 8 is read out, the volume of stored data also additionally rises during the transition to the normal speed. The difference between the predetermined frequency value N% and the maximum storage capacity is provided for this rise in occupancy. A second reading speed VSPO which lies within the capture range of the bit timing PLL 5 is preferably selected to be the maximum second reading speed VSPO. This capture range should be more than ±60%, even though a known SONY decoder CXD2500 only has a capture range of ±4%, with the result that the second reading speed VSPO can be selected as 180% of the first reading speed SSPO in order to ensure rapid filling of the buffer 8 or 16. The second reading speed VSPO is preferably selected to be within the capture range of the bit timing PLL 5 in order to permit, despite the change in the reading speed SSPO, bit timing recovery, which is necessary for the signal processing, and writing to the buffer 8 or 16 without interruption. The occupancy value N% of the buffer 8 or 16 at which the changeover between the reading speeds SSPO, VSPO is to be performed in order to prevent an overflow of the buffer 8 or 16 is determined conclusively by the transient response of the playback device between the speeds SSPO and VSPO and may be, for example, 80% of the maximum storage capacity of the buffer 8 or 16. In this case, the maximum storage capacity of the buffer 8 or 16 determines the time which can be bridged without any disturbances during the occurrence of vibrations. A flow diagram corresponding to this method is illustrated in FIG. 5. In accordance with this flow diagram, the occupancy of the buffer 8 or 16 is checked during the reading of the information medium 1 at the first reading speed SSPO. For this purpose, the current occupancy, referred to as the RAM level, of the buffer 8 or 16 is compared with a predetermined occupancy N, which is a percentage value N% of the maximum storage capacity of the buffer 8. If the current occupancy, referred to as the RAM level, of the buffer 8 is less than the predetermined occupancy value N%, the read operation is accelerated to the second reading speed VSPO. The second reading speed VSPO is then maintained until the current occupancy, referred to as the RAM level, of the buffer 8 is greater than the predetermined occupancy value N%. If the current occupancy, referred to as the RAM level, of the buffer 8 exceeds the predetermined occupancy value N%, the reading speed VSPO is preferably reduced to the first reading speed SSPO. It is thus achieved that the current occupancy RAM level increases only as the speed decreases and does not rise any further when the first reading speed SSPO is reached, since the writing and reading-out speeds correspond at this speed. The occupancy value N% is selected in such a way that the maximum storage capacity of the buffer 8 is not exceeded, taking account of this transient response. The fixed occupancy value N% is dependent both on the magnitude of the second reading speed VSPO and on the speed at which a changeover is made between the speeds, which is influenced by the inertia of the system, and may be, for example, 80% of the maximum storage capacity of the buffer 8 or 16.

The first reading speed SSPO is preferably equal to the speed used for the reproduction of information, and the second reading speed VSPO is preferably increased by 80% relative to the first reading speed.

If the current occupancy RAM level is not less than the predetermined occupancy value N%, a signal is evaluated which is in principle provided by the microprocessor 13 and represents an item of information regarding whether, for example, a vibration or a so-called shock has occurred and the writing to the buffer 8 or 16 must be stopped or whether a jump is to be made to another memory location on the information medium 1 on account of an operator instruction. After shock recovery or resetting of the scanning device 2 and a successful jump, the writing to the buffer 8 is then resumed after data synchronization has been carried out. The shock can also be detected and processed or corrected if the occupancy equals N% has not yet been reached. The time available for correction depends on the current occupancy.

In accordance with a second design, not illustrated, a first occupancy value N1 and a second occupancy value N2 are used as the predetermined occupancy value N%, the second occupancy value N2 being greater than the first occupancy value N1. The designs are identical in respect of all the other parts, so that it is possible to limit the explanations to the difference between them. The use of a first and a second predetermined occupancy value N1, N2 for controlling the reading speed in vibration-resistant playback devices is particularly advantageous with regard to a lower number of changeovers between the reading speeds SSPO, VSPO. With a first and a second predetermined occupancy value N1, N2 for controlling the reading speed, a hysteresis corresponding to the difference between the occupancy values N1, N2 is formed, which has the result that an acceleration is made from the first reading speed SSPO to the second reading speed VSPO only in the event of a lower occupancy value N1, and the reading speed VSPO is reduced to the first reading speed SSPO only when a predetermined upper occupancy value N2 is reached or exceeded. Under comparable conditions, the number of changeovers decreases as a result, a greater running smoothness is achieved and, at the same time, the power consumption is reduced further.

The changeover from a first reading speed SSPO to a second reading speed VSPO can be performed, in accordance with FIG. 2, at a variable reference frequency VR, which is set by the microprocessor MPU or 13. This is a first difference from the block diagram, indicated in FIG. 4, for the control of the drive motor M of the known vibration-resistant playback device in accordance with FIG. 3. Despite the variable reference frequency VR, a controller CLV Servo Controller is provided, by means of which the rotational speed of the drive motor M is set for a constant reading speed irrespective of the scanning radius. This is necessary because the rotational speed of the drive motor M must be set differently as a function of the scanning radius for a constant reading speed. The control of the rotational speed of the drive motor M, which is based on a comparison of the current speed information SPI with a reference, is coordinated by an actuating device which is formed by the microprocessor MPU,13 connected to the controller CLV Servo Controller and the reference frequency VR which can be set variably by the said microprocessor. In principle, this would permit a changeover between different reading speeds SSPO and VSPO. However, in order additionally to decrease the power consumption and the outlay, there is provided in the connection to the drive motor M in accordance with FIG. 2 a switch SW, which is also illustrated in FIG. 1. This switch SW enables the power supply to be interrupted, or at least greatly reduced, particularly during the reduction of the rotational speed of the drive motor M, if an electronic switch SW in the form of a semi-conductor which can be controlled in respect of its conductivity is used as the switch SW. As a result, no power is required for the drive motor M during the reduction of the rotational speed, and the power consumption is reduced. This switch SW may appear to represent an increase in the outlay in comparison with the known solution, but in fact it contributes to reducing the outlay. This is a result of the fact that the control of the rotational speed, in particular the controller CLV Servo Controller, would otherwise have to be provided with different time constants. Specifically, on the one hand deviations from a predetermined reading speed must be corrected as quickly as possible by the controller CLV Servo Controller and, on the other hand, the changeover between the reading speeds SSPO and VSPO should take place as slowly as possible in order to keep the power consumption and the requirements on the PLL low. A hard changeover would lead to an increased power consumption. Therefore, the switch SW is advantageous not only from the point of view of a lower power consumption. It has a double function and is preferably controlled by the controller CLV Servo Controller or the microprocessor MPU, 13. In accordance with FIG. 2, the switch SW can also be designed, by combination with the driver D, as a unified assembly D+SW.

The method underlying the improved vibration-resistant playback device having a reduced power consumption is summarized once more using the flow diagram illustrated in FIG. 5.

In accordance with the illustration, the starting point is a normal speed SSPO which corresponds to the normal reading speed SSPO of the information medium and hence essentially accords with the speed at which the buffer is also read out for reproducing information. If the occupancy RAM level of the buffer were to fall below a predetermined occupancy N%, the reading speed SSPO is accelerated until a maximum reading speed VSPO determined by the capture range of the PLL is reached, or until a predetermined occupancy M% of the buffer is exceeded. The occupancy M% preferably does not correspond to the maximum storage capacity of the buffer, it can be identical to the predetermined occupancy N% or correspond to an occupancy N2.

After the occupancy M% is exceeded, the drive motor M with the motor OFF is disconnected from the power supply, with the result that there is no more consumption. For this purpose, the switch SW is opened. There is then monitoring to see if the speed falls below a speed Q which preferably corresponds to the normal reading speed SSPO but may also be selected to be less than the normal speed SSPO within the capture range of the PLL. At the same time, the occupancy RAM level of the buffer is monitored to see whether it is still larger than a predetermined occupancy N%. During the period in which the rotational speed of the drive motor or the reading speed does not fall below a predetermined speed Q and the occupancy of the buffer also does not fall below a predetermined occupancy N%, the drive motor M can be disconnected from the power supply or from the driver D in order to reduce the power consumption. Only when one of the abovementioned parameters is undershot does the return to normal speed take place by connecting the power supply which drives the drive motor M. If a shock were to occur or if a jump to another scanning location were to be necessary, the further writing to the buffer is stopped and the reset procedure to the location of the interruption or a track jump is initiated and the writing is resumed after synchronization, the reading being carried out at normal speed SSPO provided that the occupancy of the buffer has not fallen below a predetermined occupancy N%.

When the drive motor M is disconnected, the rotational speed is reduced only gradually as a function of the inertia caused by the mass of the rotor, of the disk turntable and of the information medium, with the result that this can advantageously be used for reducing the power consumption.

In addition to reducing the number of returns and decreasing the power consumption, a further aspect is the synchronization or the seamless writing of data to the buffer 8, in accordance with the information stored on the information medium 1, following an interruption.

Although the abovementioned exemplary embodiments can be combined, as regards the synchronization, with the known synchronization method based on the comparison of audio or reproduction information data, a further design is specified, which can be used to increase the synchronization reliability further. It should be mentioned that the number of necessary synchronization operations have already been reduced by a smaller number of resets of the scanning device 2, which is achieved by preventing the buffer 8 or 16 from overflowing. Since the writing to the buffer 8 or 16 is interrupted only in the event of a shock- or vibration-induced interruption of the reading from the information medium 1, a higher reliability of the known synchronization has already been achieved, but it can be increased further by another type of synchronization. The control arrangement 9, which has already been mentioned in the above explanations, for controlling the reading speed SSPO, VSPO of the information medium 1 as a function of the predetermined occupancy of the buffer 8 or 16 is preferably designed as part of the decoder 11 of the playback device, as a result of which subcode information detected from the information medium 1 can advantageously be used for the signal processing and control of the vibration-resistant playback device. A first contribution is made by the use of reading speeds SSPO, VSPO within the capture range of the bit timing PLL 5, enabling uninterrupted writing of data to the buffer 8 or 16 despite a change in the reading speed.

Furthermore, the buffer 8 is arranged, in accordance with the design illustrated in FIG. 1, between a pulse-shaping and EFM demodulator unit 4 and the error correction and de-interleaving unit 10. This arrangement of the buffer 8 advantageously permits the use of address information for the purpose of synchronization. Although the address information contained in subcode information occurs only with large spacings and the reading speed is temporarily changed, said address information can be used on account of the time base compensation function based on the buffer 8. The starting point of this synchronization is formed by a valid subcode, the address information of which can be used as a reference both for the location of the interruption on the information medium 1 and for the last valid data in the buffer 8 and the writing to the buffer 8. Whenever a valid subcode occurs, that is to say whenever the CIRC check has not signalled an error, the microprocessor 13 evaluating the subcode passes the information that the last subcode was valid to the control arrangement 9. The CIRC check is an error correction code developed by Sony, CIRC representing the abbreviation of Cross Interleave Reed Solomon Code. The first address of the subcode, that is to say the address of the synchronization bytes S0, S1, is always stored in the control arrangement 9. In this way, a location of the data read from the information medium 1 is localized. After the control arrangement 9 has received the information regarding the presence of a valid subcode, the address of the buffer 8 is preferably stored in a register of the control arrangement. This stored value then forms the reference when a vibration occurs. When a vibration or a so-called shock occurs, the last valid address in the control arrangement 9 is thereby stored. Consequently, there are items of information regarding the point on the information medium at which an interruption took place and regarding the address at which writing to the buffer 8 took place and which was still valid.

After the interruption due to a shock, the scanning or reading unit is returned to a location on the information medium 1 prior to the interruption. This location may be last valid location or a location at a point a plurality of subcodes before the interruption. If the scanning device 2 is guided, for example, to a location which was five subcodes before the interruption, then it is known that the shock occurred five subcodes later, the address of which shock is known on account of the storage in the control arrangement 9. Starting from this address, a calculation is then made back to an address which is located further back, in this example, by five times the number of bytes between the subcodes, with the result that the location in the buffer 8 starting at which the previous buffer contents can be overwritten is localized.

On the other hand, it is possible to move to the subcode at which the shock occurred, and to start with the stored address. The renewed writing always begins at a synchronous byte, even if, subsequently, other valid data should still be present. This synchronization to an absolute address ensures absolutely reliable synchronization, as a result of which a chronological offset is in principle precluded. Using the address which identifies the location of an interruption on the information medium 1 and in the buffer 8, it is also possible for the synchronization and the writing to the buffer 8 following an interruption to be carried out even before the address of the interruption, since the spacing between the address read anew and the stored address of the interruption can be calculated. The data following the address are then overwritten, thus reducing the time to synchronization.

On account of the arrangement of the buffer 8 between the EFM demodulator 4 and the de-interleaving and error correction unit 10 which provides the digital audio information, use can be made of an ARAM, which is less expensive than a DRAM, as the buffer 8. The use of a ARAM or audio RAM, which may be partially defective, as the buffer 8, by which the synchronization following an interruption is also carried out, is made possible by the arrangement upstream of the error correction unit 10.

A further aspect is the rapid availability of data for reproduction after starting the playback device.

If the vibration-resistant playback device presented is started, data from the information medium 1 are available in the buffer 8 or 16 for the purpose of reproduction as early as when the normal speed corresponding to the normal or first reading speed SSPO is reached, and the reproduction does not have to be delayed until there has been an acceleration to the doubled reading speed of the known playback device, as a result of which, as a further advantage, a shorter access time is achieved.

Although the above explanations regarding the synchronization were essentially referring to an information medium 1 in the form of a CD, the field of application is not restricted thereby, since in principle all digital latches and information media, including, for example, the digital videodisk or digital tapes, have a comparatively similar data structure which enables the principle described to be applied. Consequently, the application is also possible in connection with magnetic or mechanical scanning devices and also in connection with information media in the form of tape and other two-dimensional information media.

We claim:

1. Vibration-resistant playback device, comprising: a control arrangement, a buffer, and an error correction assembly, said buffer being a partially detective buffer, for providing information signals from an information medium during an interruption of a reading of information stored on said information medium, the buffer being arranged between a first assembly for pulse shaping of signals read from the information medium, and said error correction assembly, said error correction assembly being coupled in only one direction to said buffer and operative to receive data from said buffer indicative of said information signals and correct errors in said data, to provide at an output terminal said information signals.

2. Vibration-resistant playback device according to claim 1, wherein the partially defective buffer is an ARAM.

3. Vibration-resistant playback device, comprising: a control arrangement and a partially defective buffer for providing information signals from an information medium during an interruption of a reading of information stored on said information medium, said partially defective buffer being coupled between a first assembly for pulse shaping of the signal read from the information medium and a second assembly for error correction wherein said partially defective buffer is coupled in only one direction to said error correction assembly, said error correction assembly being responsive to said buffer for receiving data indicative of said information signals and correcting errors in said data to provide said information signals.

4. Vibration-resistant playback device according to claim 3, wherein an ARAM is used as the partially defective buffer.

* * * * *